Aug. 14, 1956 W. COULSON 2,758,843
CHUCK
Filed Aug. 11, 1952 2 Sheets-Sheet 1

INVENTOR.
WALTER COULSON
BY
HIS ATTORNEY

Aug. 14, 1956 W. COULSON 2,758,843
CHUCK
Filed Aug. 11, 1952 2 Sheets-Sheet 2
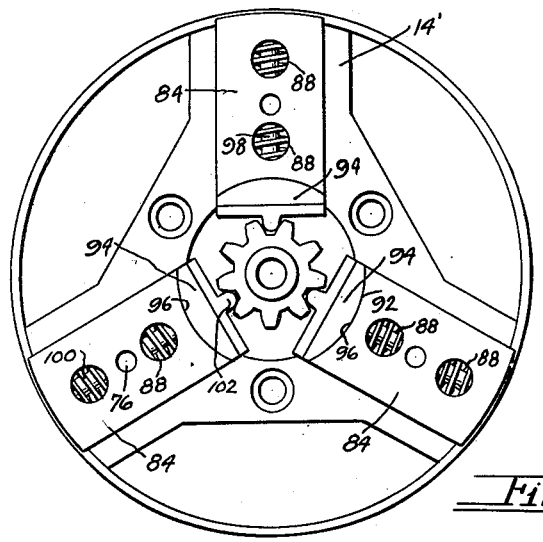
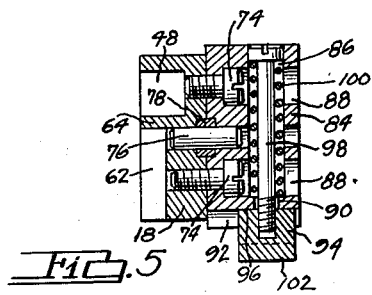
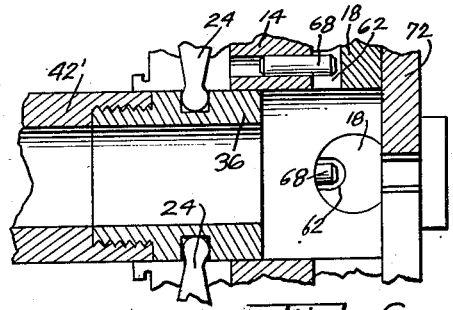
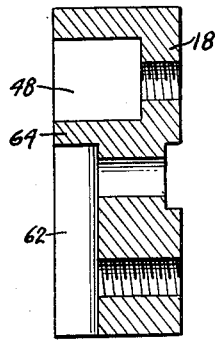
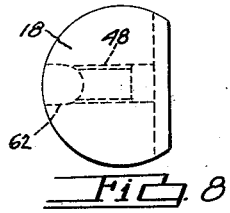
INVENTOR.
WALTER COULSON
BY
HIS ATTORNEY

United States Patent Office 2,758,843
Patented Aug. 14, 1956

2,758,843

CHUCK

Walter Coulson, Detroit, Mich.

Application August 11, 1952, Serial No. 303,722

4 Claims. (Cl. 279—119)

This invention relates to a chuck, and more particularly to a precision chuck for holding parts of symmetrical or irregular contour, and for holding gears at a point on the pitch circle in a predetermined location.

The chuck is designed to accurately grip the work which may be rotated for performing machining operations thereon or the work may held stationary while a machine tool is rotated during the machining operation.

An important object of the invention is to provide a retainer having a central bore therein for receiving a work piece and having radially movable jaws operable by relatively movable parts of the retainer during rotation of the retainer, jaws and work piece.

Another object of the invention is to provide removable jaws so that one or more jaws may be changed to a different size or irregularly shaped work pieces and to provide adjustable means for the jaws for individually varying the radial position of the jaws.

Another object of the invention is to provide an axially movable member within the retainer for imparting radial movement to the jaws and to provide means for operating the movable member during rotation of the retainer.

A further object of the invention is to provide floating members on the jaws which are individually movable on a true circle concentric to the axis of the chuck whereby the teeth of a gear may be held at points on the true pitch diameter of the gear.

Other objects and advantages of the invention will more fully appear from the following description taken in connection with the accompanying drawings, in which;

Fig. 4 is an end elevational view of a modified form of the invention, particularly adapted for chucking gears;

Fig. 5 is a cross sectional view taken on line 5—5 of Fig. 4 showing the jaw and slide member with the operable parts for the slide removed but which are shown in Fig. 2;

Fig. 6 is a fragmentary cross sectional view corresponding to Fig. 2, but showing a modified form of the draw bar construction;

Fig. 7 is an enlarged cross sectional view of the slide; and

Fig. 8 is a top plan view of Fig. 7.

Figure 1:
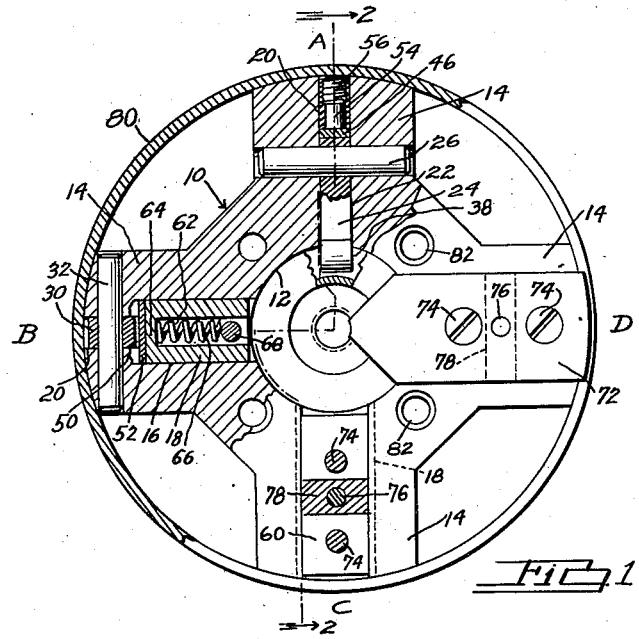
Fig. 1 is an end view of my improved chuck, parts being broken away and in section; the quadrant A being viewed on a line A—A of Fig. 2; the quadrant B being viewed on a line B—B of Fig. 2; the quadrant C being viewed on a line C—C of Fig. 2; and the quadrant D being viewed on a line D—D of Fig. 2.
Figure 2:
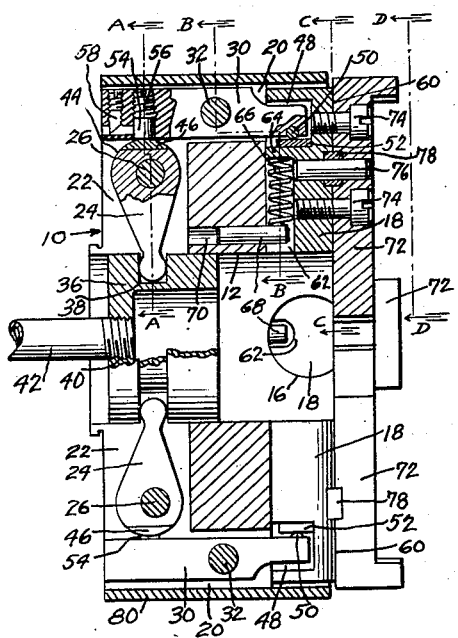
Fig. 2 is a cross sectional view taken on line 2—2 of Fig. 1.
Figure 3:
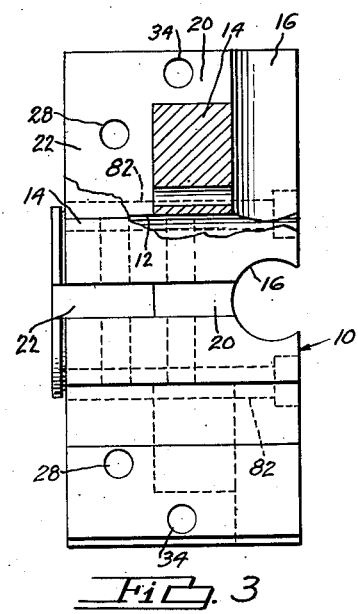
Fig. 3 is side elevational view of the retainer body, partly broken away and in section.

Referring to the drawings, particularly Figs. 1, 2 and 3, I have shown a retainer body 10 having a central axial bore 12 and radially extending arms 14, herein shown as four. Each arm 14 is provided with a radially extending bore 16, from the outer end of the arm 14 to the bore 12, and intersects the outer front face surface of the arm 14, thus providing a guide surface for a cylindrical slide 18 in each of the arms 14. Each arm 14 is further provided with a longitudinally extending, rectangular slot 20 across the outer end of the arm and a radially extending, rectangular slot 22 in the rear face of the body 10. A lever cam 24, in the slot 22, is pivotally mounted on a cross pin 26, through a transverse hole 28 in the body 10, and a rocker arm 30, in the slot 20, is pivotally mounted on a cross pin 32 through a transverse hole 34 in the body 10.

A collar 36 is longitudinally slidable in the bore 12 and is provided with an outer annular groove 38 which receives the inner ends of the lever cams 24. As shown in Fig. 2 the outer end of the collar 36 is provided with a threaded hole 40 for receiving a draw bar 42 which may be manually or mechanically moved longitudinally for sliding the collar 36 axially in the bore 12. As illustrated in Fig. 6 the draw bar 42' may be tubular so that the work may be fed axially through the chuck for bar stock feed.

The lever 24 has its outer surface, surrounding the cross pin 26, eccentrically mounted to provide a cam surface 44. A portion of the outer surface is provided with a pressure pad 46 preferably formed of carbaloy to withstand wear.

The rocker arm 30 has one of its ends resting on the cam surface 44 and its opposite end projecting into an opening 48 in the slide 18. A carbaloy wear pin 50 is provided in the lower surface of the arm end entering the opening 48 and a carbaloy pressure pad 52 is secured to the lower surface of the opening 48 for contacting the wear pin 50. The end of the arm resting on the cam surface pressure pad 46, has a slidable carbaloy wear pin 54 backed by an adjusting screw 56 and locked in adjusted position by bevel ended pins 58 arranged at right angles to each other and locked tightly against the wear pin 54.

The slide 18 is more clearly shown in Figs. 7 and 8. It is formed from a cylindrical body having one side machined flat as at 60, which when the parts are assembled, lies substantially flush with the front face of the body 10. In addition to the side opening 48 there is a longitudinally extending side opening 62 through the lower end of the slide 18, terminating short of the opening 48, forming a ledge 64 against which a compression spring 66 is adapted to urge the slide 18 upwardly into contact with the end of the rocker arm 30 which extends into the opening 48. The opposite end of the spring 66 is supported on a pin 68 in an opening 70 of the body 10, projecting into the opening 62.

The jaws 72 are detachably secured to the flat face 60 of the slide 18 by screws 74. An aligning pin 76 is received in aligned openings in the slide 18 and the jaw 72, passing through a key 78 in both adjacent faces of the slide 18 and jaw 72. The jaws 72 and slides 18 are urged radially outwardly by the springs 66 and are moved radially inwardly by the lever cam 24, acting through the rocker arm 30. The work is received between the inner ends of the jaws 72 when the collar 36 is moved inwardly of the chuck, and the work is held between the inner ends of the jaws 72 by moving the collar 36 outwardly which swings the lever cams 24 to the left and pivots the rocker arms 30 in a clockwise direction, by the cam surface 44, thereby urging the slides 18 and jaws 72 inwardly against the compression of the springs 66.

After assembly of the parts, a sealing sleeve 80 is press fitted over the outer ends of the arms 14 and the chuck assembly may be attached to the head stock of a lathe or other machine by screws, not shown, through holes 82 in the body 10.

In the form of the invention shown in Figs. 4 and 5,

I have shown a three jaw chuck, particularly adapted for holding a gear on 18 the pitch diameter of the gear teeth while machining an opening through the gear body concentric with pitch diameter. The body of the chuck is similar to the chuck shown and described in Figs. 1, 2 and 3, except that there are three jaws in place of four and the removal jaw members are modified to include a floating work contact member which is free for limited circumferential movement about the center of the chuck.

Slight inaccuracies in the spacing between the teeth surfaces of gears produces inaccuracy in holding the gear precisely on its pitch diameter. The number of teeth in a gear also requires a variation in the circumferential spacing of the contact points of the jaws to enter the space between the teeth.

The slides 18 are the same as the slides shown in Figs. 1 and 2. The jaws 72 are removed and the jaws 84 are attached to the slides 18. Each jaw 84 is thicker than the jaw 72 and is provided with a bore 86 through its outer end intersecting the counter bored holes 88 for the screws 74. The bore 86 terminates close to the inner end of the jaw 84 and a smaller diameter hole 90 is formed in the material between the inner end of the bore 86 and the inner end of the jaw 84.

The inner end face 92 of the jaw 84 is accurately machined on a transverse arc having a radius equal to the distance between the center of the chuck and the end face of the jaw. A floating shoe 94 having an arcuate outer surface 96 corresponding to the end face 92 of the jaw 84, is supported with its arcuate surface in frictional engagement with the arcuate face 92 of the jaw, by a headed bolt 98, threaded into the body of the shoe 94 and extending through the bore 86. A compression spring 100 surrounds the bolt 98 and is compressed between the bottom wall of the bore 86 and the head of the bolt 98 whereby the shoe 94 is drawn against the end face 92 of the jaw 84. The hole 90 is larger than the diameter of the bolt 98 so that the shoe is free for limited sliding movement transversely of the jaw and in a circumferential direction about the center of the chuck.

The inner end of the shoe 94 is provided with a radially extending projection 102 having an outer semi-circular surface formed on a radius equal to half the distance between the adjacent faces of the gear teeth at the pitch diameter. This projection enters a space between two teeth and the three jaws their floating projections securely hold a toothed gear in chucked position for machining. The floating shoes provide self aligning contacts for any gear of any number of teeth.

If it is desired to hold a workpiece of irregular shape in the chuck, any one or more than one of the jaws may be replaced by a longer or shorter jaw and for slight variations in the location of the inner ends of the jaws, any jaw may be advanced or retracted from the center of the chuck by adjustment of the screw 56.

I have herein illustrated and described a preferred embodiment of the invention but it will be understood that various changes, including the size, shape and arrangement of parts may be made without departing from the spirit of my invention and it is not my intention to limit its scope other than by the terms of the appended claims.

I claim:

1. A chuck of the class described comprising, a retainer body having a central opening therein for receiving a work piece, a plurality of radially movable jaws for clamping the work piece between the jaws, a rocker arm pivotally supported on said retainer body and having one end thereof operatively connected to a jaw for moving the latter radially by rocking movement of said rocker arm, a radially adjustable pin carried by the opposite end of said rocker arm, a cam lever pivotally supported on said retainer body and having a cam face for engagement with said radially adjustable pin of said rocker arm, and axially movable means for swinging said cam lever about its pivotal support.

2. A chuck of the class described comprising, a retainer body having a central opening therein for receiving a work piece, a plurality of radially movable slides carried by said body, a rocker arm carried by said body for each slide, a cam lever having a cam surface for each rocker arm, means for swinging said cam levers to radially move said slides by movement of said rocker arms, radially adjustable cam contact members between said cam surfaces and said rocker arms, resilient means for urging said slides radially outwardly of said body, and movable jaws carried by said slides.

3. A chuck of the class described comprising, a retainer body having a central opening therein for receiving a work piece, radially extending cylindrical bores intersecting the outer end face of said body and extending outwardly from said central opening, sliding cylindrical members having a flat side face flush with the outer end face of said body, and removable jaw members carried by said cylindrical members, said jaws contacting the outer end face of said body and the flat face of said cylindrical members.

4. A chuck of the class described comprising, a retaining body having a central axially extending opening therein for receiving a work piece, radially extending jaws carried by said body, floating shoes carried by the inner ends of said jaws, the contacting faces between said shoes and said jaws being formed on an arc concentric with said central opening, and means for moving said jaws radially of said central opening.

References Cited in the file of this patent

UNITED STATES PATENTS

| | | |
|---|---|---|
| 945,261 | Blum | Jan. 4, 1910 |
| 1,251,986 | McClellan | Jan. 1, 1918 |
| 1,699,358 | Hay | Jan. 15, 1929 |
| 1,844,616 | Whiton | Feb. 9, 1932 |
| 1,849,546 | Lippard | Mar. 15, 1932 |
| 2,356,198 | Barry et al. | Aug. 22, 1944 |
| 2,523,374 | Jensen | Sept. 26, 1950 |
| 2,543,117 | MacMann | Feb. 27, 1951 |

FOREIGN PATENTS

| | | |
|---|---|---|
| 40,350 | Switzerland | July 1, 1907 |
| 221,655 | Switzerland | June 15, 1942 |